United States Patent

Pratt et al.

[11] Patent Number: 5,585,455
[45] Date of Patent: Dec. 17, 1996

[54] REINFORCEMENT COMPOSITES FOR THERMOSETTING POLYMER SYSTEMS

[75] Inventors: Billy D. Pratt, Seneca; Kenneth D. Collins, Westminster, both of S.C.

[73] Assignee: CollinsCraft Fiberglass Corp., Westminster, S.C.

[21] Appl. No.: 232,385

[22] Filed: Apr. 25, 1994

[51] Int. Cl.⁶ .............................. B32B 5/26; B32B 5/28; B32B 7/12

[52] U.S. Cl. .................. 428/245; 428/246; 428/251; 428/253; 428/261; 428/284; 428/285; 428/286; 428/298; 428/302; 428/341

[58] Field of Search ............................ 428/224, 341, 428/228, 251, 252, 253, 261, 286, 298, 245, 246, 284, 285, 302; 156/283

[56] References Cited

U.S. PATENT DOCUMENTS

| | | | |
|---|---|---|---|
| 4,491,617 | 1/1985 | O'Connor et al. | 428/236 |
| 4,649,077 | 3/1987 | Lauchenauer | 428/317.1 |
| 5,132,167 | 7/1992 | Prato | 428/251 |

OTHER PUBLICATIONS

Insert to *COFAB Boat Book*, Applications and Advantages of Weft Knitted Reinforcements in Boats, ©1986 Gulf States Paper Corporation.

*Primary Examiner*—D. S. Nakarani
*Attorney, Agent, or Firm*—Kilpatrick & Cody

[57] ABSTRACT

A composite reinforcement for use in pultrusion and other thermosetting manufacturing processes to produce products with smooth surfaces free of wrinkles and laps, methods of producing such a composite reinforcement and thermosetting polymer system products reinforced with the composite. Two or more layers of reinforcement material are bonded with powdered polyethylene or another appropriate polyolefin or polyethylene copolymer adhesive utilizing heat to produce a multi-ply composite reinforcement. This composite reinforcement can then be appropriately sheared, die cut or otherwise processed, if desirable, and thereafter used in pultrusion, cylinder winding, compression molding, open mold processing and other thermosetting manufacturing techniques with thermosetting resins in the final production process.

12 Claims, 2 Drawing Sheets

REINFORCEMENT COMPOSITES FOR THERMOSETTING POLYMER SYSTEMS

BACKGROUND OF THE INVENTION

This invention relates to reinforced plastic materials and manufacturing processes.

A wide variety of products are produced utilizing thermosetting plastic polymer systems and fibrous reinforcement materials. It is frequently desirable to produce such products utilizing mat, fabric, or roving reinforcement in various combinations of two or more reinforcement layers. It is difficult, however, to produce such products without undesirable wrinkles and laps, and conventional production processes are therefore often laborious and wasteful.

For instance, prior pultrusion processing typically requires a number of glass fiber forms to be continuously unwound and subsequently combined with a polyester nonwoven fabric that becomes (together with plastic resin) the surface of the pultruded profile. These individual plys must progress through former shoes and then be submerged in a thermosetting polymer. The polymer-saturated materials are thereafter further formed by stripping shoes. Finally, the treated materials are pulled through a heated die where they are thermoset into profiles such as angles, rods, tubes, channels or sheets. Successfully handling the individual plys during this production process can be very difficult.

Reinforcement fabrics and mats have previously been bonded into reinforcement composites with polyester resins to facilitate pattern cutting and subsequent handling in thermoset processing. However, such polyester resins are expensive and require high temperature processing, which precludes use of such resins for bonding certain desirable reinforcement fabrics, mats and other materials.

SUMMARY OF THE INVENTION

The present invention provides a composite reinforcement for use in pultrusion and other thermosetting manufacturing processes to produce products with smooth surfaces free of wrinkles and laps, methods of producing such a composite reinforcement and thermosetting polymer system products reinforced with the composite. Two or more layers of reinforcement material are bonded with powdered polyethylene adhesive or another appropriate polyolefin or polyethylene copolymer adhesive utilizing heat to produce a multi-ply composite reinforcement. This composite reinforcement can then be appropriately sheared, die cut or otherwise processed, if desirable, and thereafter used in pultrusion, cylinder winding, compression molding, open mold processing and other thermosetting manufacturing techniques with thermosetting resins in the final production process.

Composite reinforcement produced in accordance with the present invention can be made from two or more of: continuous or chopped strand glass mat; knitted, woven or nonwoven glass fabrics; woven glass roving; woven, nonwoven and knitted fabrics of other fibers, including polyester fiber, and other conventional and high performance reinforcement materials. By bonding two or more reinforcement materials using inexpensive polyethylene, polyolefin or polyethylene copolymer adhesives, it is possible to produce a composite reinforcement that can be used in a manner that simplifies production of final products while requiring little or no modification of the thermosetting polymer systems used in such products, because the bonded composite is resistant to styrenated polyester resins, epoxy resins and phenolic resins in the wet state, and further thermoset processing does not effect the ply-to-ply bond within the composite reinforcement.

These and other objects and benefits of the present invention will be further understood by reference to the figures, the following detailed description of the figures and the claims.

DETAILED DESCRIPTION OF THE DRAWINGS

Figure 1:
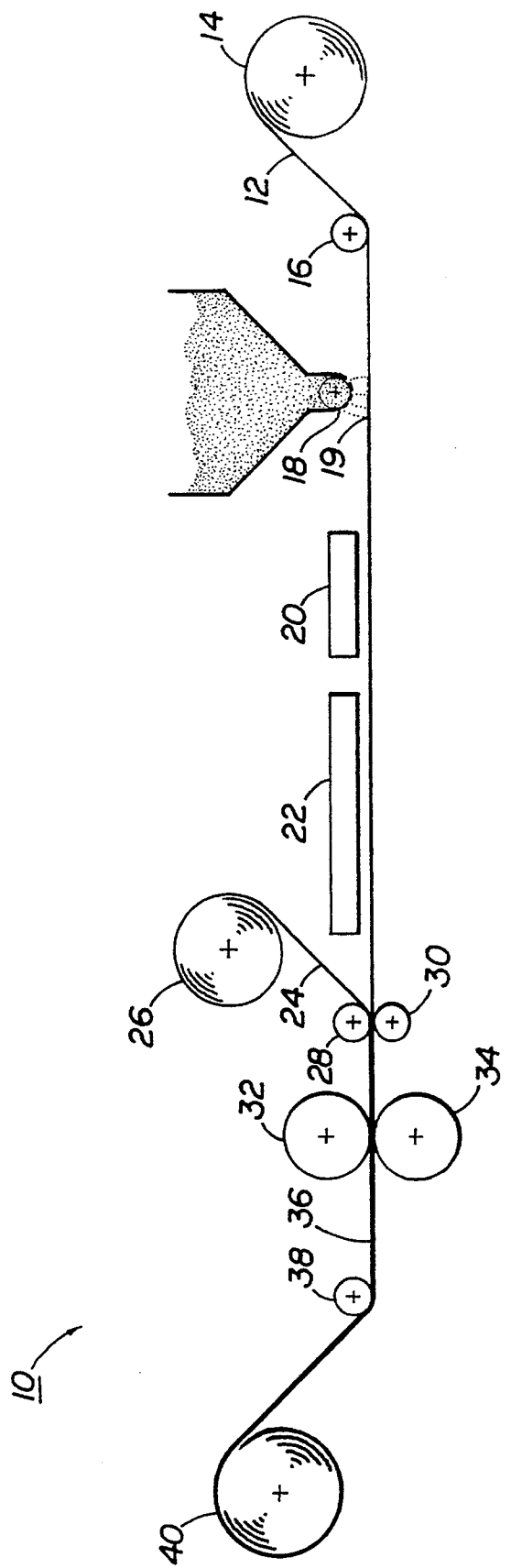
FIG. 1 shows a schematic diagram of a side elevation view of a machine for producing composite reinforcement in accordance with the present invention.

FIG. 1 schematically illustrates a machine 10 for producing composite reinforcement in accordance with the present invention. A first web of material 12, which may, for instance, be knitted glass fabric, unrolls from roll 14 and travels under a tensioning roller 16 and then under a metering device 18 that deposits a light coating of powdered polyethylene, polyolefin or polyethylene copolymer adhesive 19 on the surface of web 12. Appropriate quantities of adhesive 19 range between approximately one (1) to eight (8) grams per square foot, preferably between approximately one (1) to four (4) grams per square foot and most preferably between approximately one (1) to two (2) grams per square foot.

Metering device 18 may include a knurled roller that picks up adhesive 19 from a hopper as the knurled roller rotates with a brush that removes the powdered adhesive 19 from the knurled roller to permit it to drop on to the web 12.

Web 12 then passes under a first heater or preheater 20 that heats the adhesive 19 and surface of web 12 to, for instance, 275° F. Web 12 then passes under a second heater 22 that further elevates the surface temperature of web 12 and the adhesive 19 to, for instance, 350° F. As will be understood by one skilled in the art, such heat softens and liquifies the powdered adhesive previously deposited on web 12, thereby causing adhesive 19 to become tacky.

A second web 24, which may, for instance, be a web of nonwoven polyester fabric, is unrolled from roll 26 and calendared onto the first web 12 by passing both webs 12 and 24 through nip rollers 28 and 30 so that webs 12 and 24 are pressed against each other for bonding by the adhesive 19 liquified by heaters 20 and 22. Such bonding is facilitated by passing the webs 12 and 24 through chill rollers 32 and 34, which reduce the temperature of, and therefore solidify, the adhesive 19. The composite web 36 comprising webs 12 and 24 bonded with adhesive 19 then proceeds past a tensioning or direction-change roller 38 to form a web roll 40 of composite web 36.

As noted above, webs 12 and 24 could be any desired combination of conventional and high performance reinforcement materials, including, but not limited to, continuous and chopped strand glass mat; knitted, woven and nonwoven glass fabric; woven glass roving; and other fabrics and mats. Additionally, composite reinforcement materials in accordance with the present invention can be produced having not only two layers but also three or more layers.

While the foregoing example was described utilizing powdered polyethylene adhesive, the present invention could be practiced utilizing other polyolefin or polyethylene adhesives, as well as other thermoplastic adhesives that are compatible with thermosetting polymer systems. In order to be compatible, an adhesive 19 used in practicing the present invention must be one not effected by any component of the thermosetting polymer system used in subsequent processing and that does not permit delamination of the web layers 12 and 24. Any adhesive soluable in thermosetting polymer systems would not be appropriate for use in practicing the invention.

A specific powdered polyethylene adhesive material usable in the practice of the present invention is "MN 710-20," 50 mesh particle size, available from Quantum Chemical Corporation, USI Division, 11500 Northlake Drive, Cincinnati, Ohio 45149.

Figure 2:
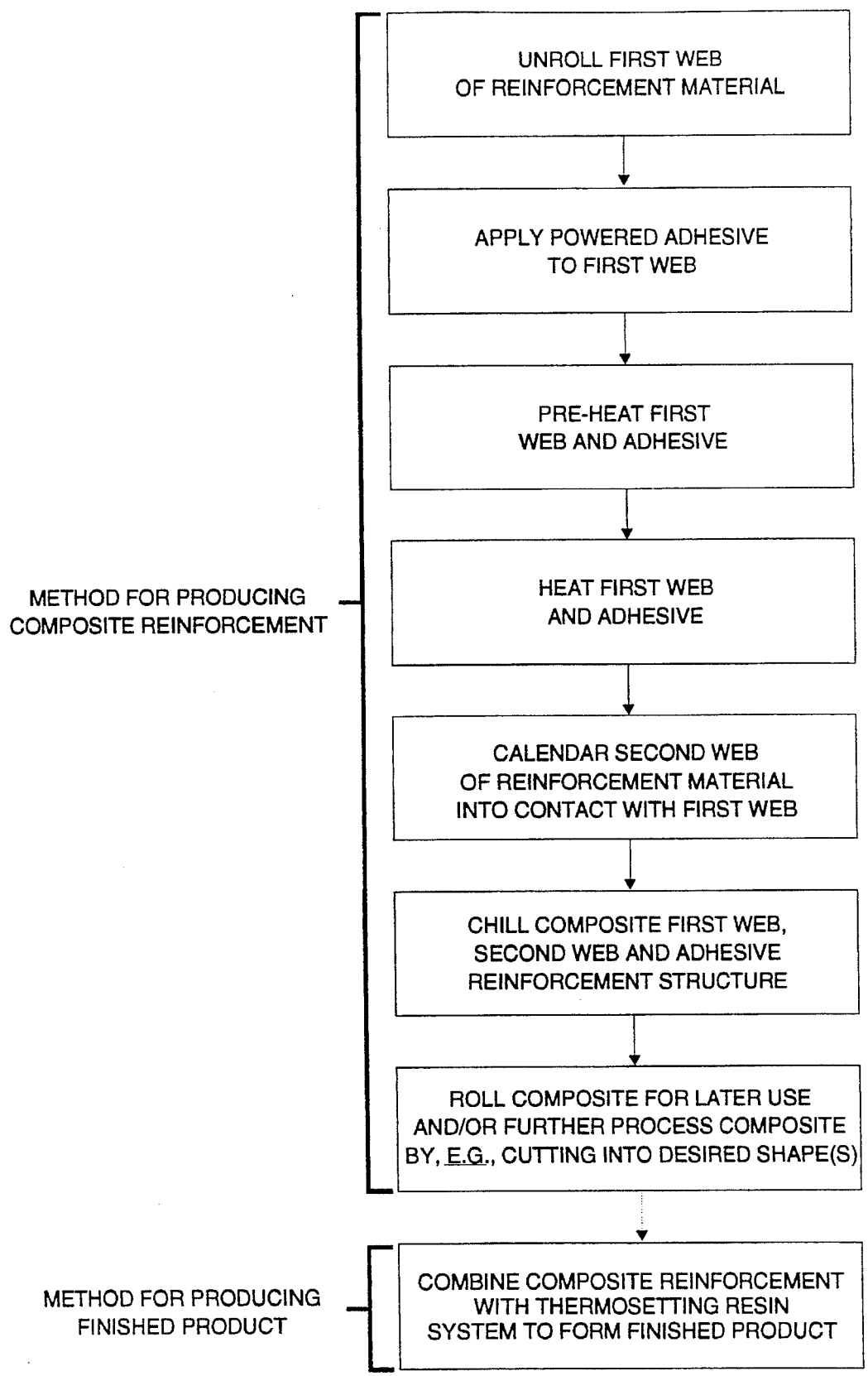
FIG. 2 is a flow diagram illustrating the principal steps in the practice of the present invention.

FIG. 2 is a flow diagram illustrating the principal steps in practice of the present invention utilizing two reinforcement webs. A first web of reinforcement material is unrolled. Powdered adhesive is then applied to that web, and the web and adhesive are preheated. If necessary, the web and adhesive are further heated to an appropriate temperature at which the adhesive is adequately tacky and liquid. A second web of reinforced material is then pressed into contact with the first web as, for instance, by calendaring the first and second webs with the adhesive therebetween. The composite first and second webs and adhesive reinforcement structure is chilled and then rolled up for later use and/or cut or otherwise processed into desired shapes. Production of finished products utilizing the so-formed composite reinforcement material is then accomplished by combining the composite reinforcement material with a thermosetting resin system.

The present invention is not limited to the details of the exemplary embodiments described above, but embraces numerous modifications and variations within the scope and spirit of the foregoing description and the following claims.

We claim:

1. A composite reinforcement for use with thermosetting polymer systems, comprising
   a first reinforcement web bonded to a second reinforcement web with a powdered thermoplastic adhesive that is not soluble in the thermosetting polymer systems,
   wherein the materials of the first and second reinforcement webs are selected from the group consisting of continuous or chopped strand glass mat, knitted, woven or non-woven glass fabrics, woven glass roving, polyester, and woven, nonwoven and knitted fabrics of other conventional and high performance fibers, and
   wherein the quantity of thermoplastic adhesive is between approximately one and eight grams per square foot of the first reinforcement web.

2. The composite reinforcement of claim 1, wherein the quantity of thermoplastic adhesive is between approximately one and four grams per square foot of the first reinforcement web.

3. The composite reinforcement of claim 1, wherein the quantity of thermoplastic adhesive is between approximately one and two grams per square foot of the first reinforcement web.

4. The composite reinforcement of claim 1, wherein the first reinforcement web is fiberglass continuous strand mat and the second reinforcement web is nonwoven polyester fabric.

5. The composite reinforcement of claim 4, wherein the thermoplastic adhesive is powdered polyolefin adhesive.

6. A composite reinforcement for use with thermosetting polymer systems, comprising
   fiberglass continuous strand mat bonded to nonwoven polyester fabric with a powdered thermoplastic adhesive that is not soluble in the thermosetting polymer systems,
   wherein the adhesive is a powdered polyethylene adhesive, and
   wherein the quantity of the polyethylene adhesive is between approximately one and eight grams per square foot of the fiber glass continous strand mat.

7. The composite reinforcement of claim 6, wherein the quantity of powdered polyethylene adhesive is between approximately one and four grams per square foot of the fiber glass continous strand mat.

8. The composite reinforcement of claim 6, wherein the quantity of powdered polyethylene adhesive is between approximately one and two grams per square foot of the fiber glass continous strand mat.

9. A composite material comprising
   (a) a first reinforcement web bonded to a second reinforcement web with a powdered thermoplastic adhesive that is not soluble in thermosetting polymer systems, and
   (b) a thermosetting polymer system combined with the bonded first and second reinforcement webs by impregnating with the thermosetting polymer system,
   wherein the materials of the first and second reinforcement webs are selected from the group consisting of continuous or chopped strand glass mat, knitted, woven or non-woven glass fabrics, woven glass roving, polyester, and woven, nonwoven and knitted fabrics of other conventional and high performance fibers, and
   wherein the quantity of thermoplastic adhesive is between one and eight grams per square foot of the first reinforcement web.

10. The composite of claim 9, wherein the first reinforcement web is fiberglass continuous strand mat and the second reinforcement web is nonwoven polyester fabric.

11. The composite of claim 10, wherein the thermoplastic adhesive is powdered polyolefin adhesive.

12. The composite of claim 11; wherein the polyolefin adhesive is powdered polyethylene adhesive.

* * * * *